Patented May 19, 1936

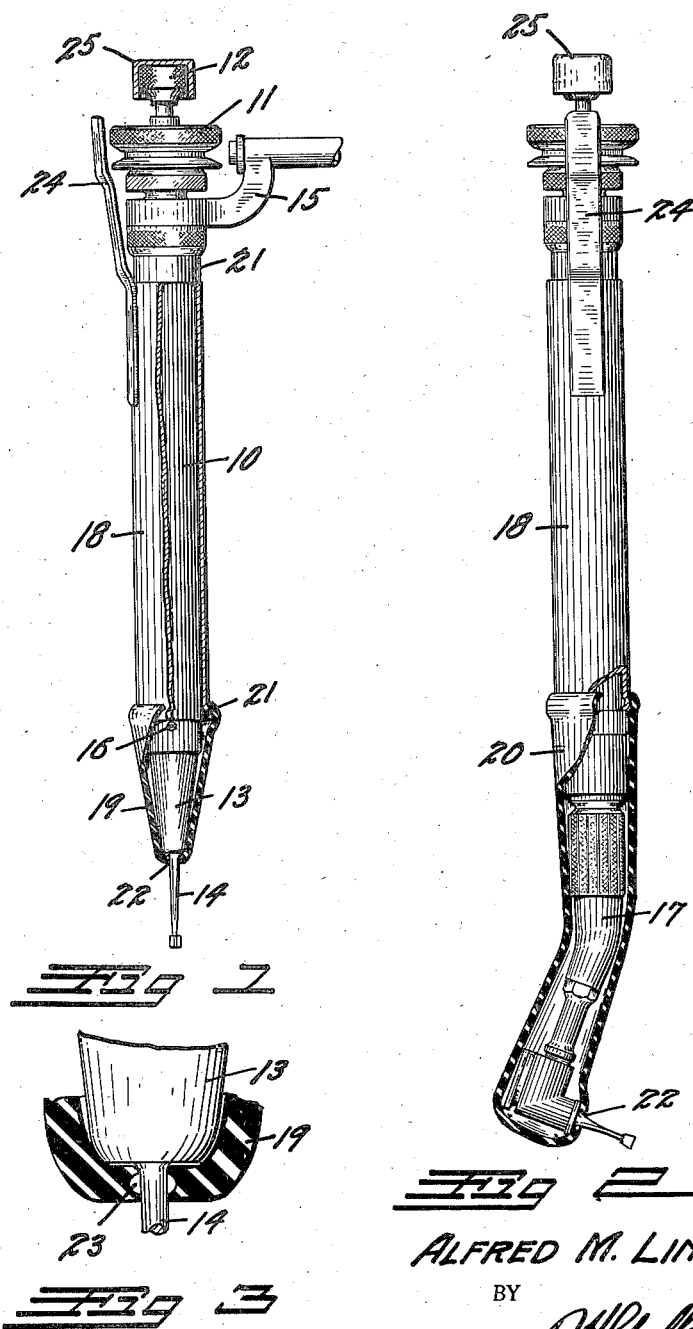

2,041,077

UNITED STATES PATENT OFFICE 2,041,077

PROTECTOR FOR DENTAL DRILL HAND PIECES

Alfred M. Lininger, Englewood, Colo.

Application March 2, 1935, Serial No. 9,026

2 Claims. (Cl. 32—30)

This invention relates to a protector for dental hand pieces. It is exceedingly difficult to maintain a dental handpiece sterile, owing to the fact that it consists of small gears, bearings, etc., which must be kept lubricated, and which can not therefore be conveniently sterilized. These hand pieces are placed in the mouths of the patients, where they are quickly contaminated and become a source of infection.

The principal object of the invention is to provide a protecting device which will absolutely protect both the operator and patient from contact with the hand piece or its operating mechanism, and will also protect the hand piece from being contaminated or injured from saliva, etc.

Other objects and advantages reside in the detail construction of the invention, which is designed for simplicity, economy, and efficiency. These will become more apparent from the following description.

In the following detailed description of the invention reference is had to the accompanying drawing which forms a part thereof. Like numerals refer to like parts in all views of the drawing and throughout the description.

In the drawing:—

Fig. 1 is a side elevation of a typical straight dental hand piece illustrating the invention in place thereon. In this view, the protector has been partially broken away to show the interior thereof.

Fig. 2 is a similar view of the protector adapted to a contra-angle on the hand piece.

Fig. 3 is a magnified section, taken at the bur opening of the protector.

In the drawing, a typical hand piece is indicated at 10 with its spindle pulley at 11, chuck adjusting screw at 12 and sheath collar at 21. The chuck portion of the hand piece is shown at 13, for receiving the usual drill or bur 14 or other tool. A portion of the wrist joint frame is shown at 15 and the hand piece attachment screw at 16 for holding angle members such as shown at 17 in place thereon.

The invention comprises: a light metallic sleeve 18 and a series of removable rubber tips such as shown at 19 and 20. The sleeve is of a length to enclose the entire sheath of the hand piece 10 from the sheath collar 21 to the attachment screw 16. The sleeve is made slightly larger than the sheath of the hand piece, and is of resilient material so that it can be slightly distorted and slid over the screw 16, and will snap into place behind this screw, as shown in Fig. 1. The screw will then hold the sleeve in place over the sheath until it is manually pulled therefrom.

The lower extremity of the sleeve is provided with an annular bead 21, which is engaged by the rubber tips 19 and 20 to hold the latter in place.

The sleeve 18 of the device is similar, regardless of whether the hand piece is being used straight or with an angle head 17. The rubber tips differ, however, the tip 20 being sufficiently long to enclose the entire angle 17.

Both tips are provided with an opening 22 opposite the chuck opening for the passage of the drill or bur 14. This opening is preferably made slightly smaller than the diameter of the bur shank so that the natural elasticity of the rubber will cause the latter to form a water-tight joint at the bur shank.

To provide lubrication at this point, it is preferred to dip the shanks in a suitable lubricant before they are inserted through the opening 22. This acts to relieve friction and also to further seal the running joint at this place. To facilitate holding the lubricant in place, it is preferred to form a lubricant channel 23 about the shank opening, as shown in Fig. 4, so that the lubricant will be maintained about the drill shank at all times.

It can be readily seen that the above construction will protect the hand piece and its contained mechanism from contamination, and will also protect the patient from contact with the hand piece. The tips can be readily pulled from place and the sleeve can be slid from the hand piece and conveniently sterilized for each operation. The sleeves may be formed of stainless steel or chromium plated metal so as to avoid corrosion and are sufficiently light in weight not to interfere with the normal use of the hand-piece.

During an oral operation, it is often necessary for the operator to often change the burs, drills, or mandrels in the chuck, and to do this, he must hold the spindle pulley 11 while he loosens or tightens the chuck screw 12. These latter parts cannot be kept sterile, and if contacted by the operator's fingers, can transfer infection to the patient.

To prevent this, a metallic thumb strip 24 is secured to the upper portion of the sleeve 18, and extends upwardly alongside the pulley 11 normally out of contact therewith. This enables the operator to place his thumb against the sterilized strip 24 to hold the pulley from rotation during the drill changing operations A cap 25 is formed of noncorrosive metal is provided for covering the head of the chuck screw 12.

This cap is preferably formed of resilient metal, although it could be of rubber, and is preferably slightly distorted so that its open side is normally oval in shape. This distortion causes the cap to cling to the head of the screw 12 to maintain the former in place. It can therefore be readily seen that the operator need not contact a single unsterile surface during his operation of the hand piece.

The tip 19, illustrated in Fig. 1, is for the usual straight hand piece. The tip illustrated in Fig. 3 is for a contra-angle for the hand piece. A similar tip could be formed for a right angle head which would be similar to the tip 20, except shorter in length.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A protector for dental hand pieces of the type having a projection for aligning an angle attachment comprising: a metallic sleeve shaped to slide over the sheath of said hand piece and spring in place back of said projection; a rubber tip shaped to fit over the chuck of said hand piece and engage the extremity of said sleeve, said tip being provided with an opening for the passage of the operating instrument; and a metallic member extending upwardly from said sleeve so as to assume a position opposite the spindle pulley of said hand piece.

2. A protector for dental hand pieces having a projection adjacent the lower extremity of said hand piece comprising: a resilient metallic sleeve of a diameter to slip snugly over said hand piece and snap into place back of said projection; a rubber tip provided with an opening for an operating tool, said tip being of a diameter to snugly engage the lower extremity of said sleeve; and a strip member secured to and extending upwardly from said sleeve to a position adjacent the spindle pulley of said hand piece.

ALFRED M. LININGER.